2,781,863
Patented Feb. 19, 1957

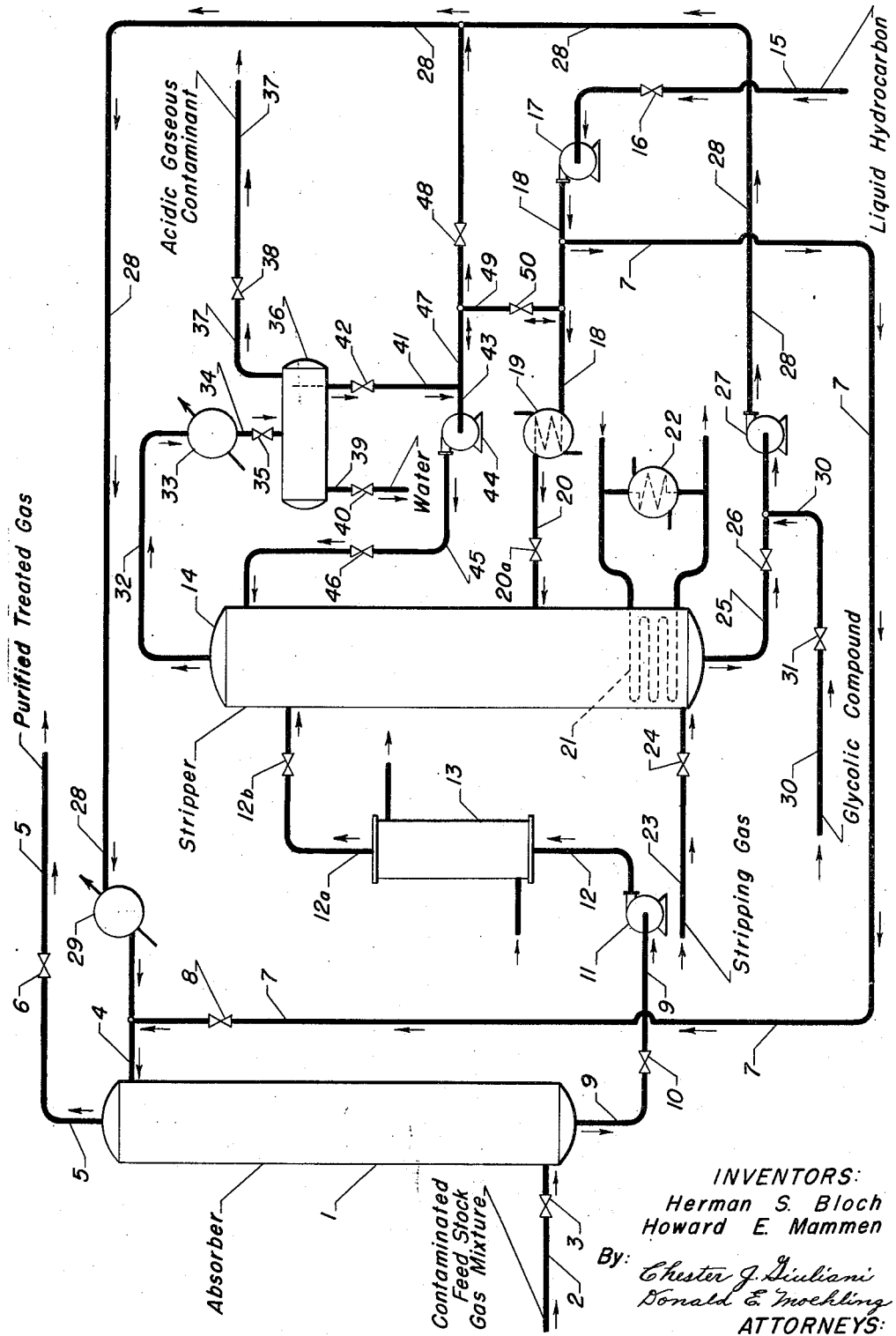

2,781,863

GAS PURIFICATION PROCESS

Herman S. Bloch, Chicago, and Howard E. Mammen, North Riverside, Ill., assignors to Universal Oil Products Company, Des Plaines, Ill., a corporation of Delaware Application December 30, 1953, Serial No. 401,124

18 Claims. (Cl. 183—115)

This invention relates to a process for treating normally gaseous mixtures containing an acidic contaminating component desirably removed from the gas stream to produce a treated gaseous effluent substantially free from the contaminant and moisture. More specifically, the invention concerns a gas washing process for removing from a gaseous mixture an acidic contaminant thereof which interferes with the use of the principal gaseous component of the mixture in a conversion process operated in conjunction with the gas purification process. In the present gas purification process the gaseous feed stock mixture is contacted with a substantially anhydrous absorbent composition consisting of a mixture or solution of a hydrocarbon and an anhydrous glycol, a polyalkylene glycol, or an ether, or ester of said glycol or polyalkylene glycol. The method is particularly adapted to the removal of hydrogen sufide from a gaseous mixture comprising predominantly hydrogen and/or light hydrocarbon gases.

In many organic and inorganic conversion processes in which one of the reactant feed stocks is a gas or mixture of gases, particularly in certain processes for converting hydrocarbons by passing the same with the gaseous reactant over or through a catalyst, it often becomes essential for economy reasons to recycle a stream of the gaseous reactant in order to maintain the molar ratio of the latter gas and the rate of conversion at high level, but nevertheless conduct the conversion in the absence of any substantial quantity of water vapor or certain other contaminants of the gas stream such as undesirable impurities introduced into the recycle gas stream as a result of contamination of the feed stocks supplied to the process. Thus, for example, in the polymerization of olefinic hydrocarbons, such as ethylene, propylene, butylene and isobutylene, utilizing a catalyst such as aluminum chloride, sulfuric acid, phosphoric acid, or an acidic phosphate catalyst, it is known that the product quality and the yield of product from the polymerization reactor is substantially greater when the olefinic gaseous feed stock is substantially anhydrous and contains no substantial proportion of hydrogen sulfide, ammonia or other contaminants which adversely affect the activity of the catalyst. In the majority of such conversion processes, at least a portion of the gaseous feed stock passes unconverted through the catalytic reactor and this portion must generally be recycled in the process in order to realize an economic yield on the basis of the volume of feed stock charged to the process. Before the unconverted portion can be recycled, it must generally be freed of moisture and other contaminating impurities present in the charge stock or picked up during the operation of the process in order to prevent deactivation and other deterioration of the catalyst. Similarly, in the catalytic reforming of certain naphtha fractions, for example, by passing the naphtha feed stock with hydrogen over a solid catalyst such as a composite of alumina and chromia or a combined platinum-alumina-halogen catalyst, the hydrogen reactant is supplied to the process in a molar excess, leaving a residue of unconverted hydrogen which appears in the product effluent from the reactors and is recovered for recirculation. Since most hydrocarbon charge stocks are contaminated with sulfur compounds, hydrogen sulfide is formed during the catalytic reforming conversion and makes its appearance as a contaminant of the recovered hydrogen stream. In many instances the reactor charge stock also contains small amounts of water, which appears in the hydrogen stream as contaminating water vapor. Because of the adverse effect of the hydrogen sulfide and moisture on the activity of the reforming catalyst, the hydrogen sulfide and moisture contaminants must generally be removed to a substantial extent before recycling the residual hydrogen to the reforming conversion process.

The gas washing process of the present invention has as its principal objectives the simultaneous removal or recovery of moisture and the acidic components of an essentially gaseous mixture, to provide a simple, efficient method for removing an acidic gas contaminant and moisture from a mixed gaseous feed stock using an anhydrous liquid absorbent composition, to provide for the regeneration of the composition and to effect such regeneration by readily effected means. These objectives are accomplished in accordance with this invention by means of a gas washing process which comprises contacting the contaminated gas mixture containing the acidic gas contaminant and water (if present in the mixture) with a substantially anhydrous liquid absorbent composition consisting of at least one water-miscible component selected from an alkylene glycol, a polyalkylene glycol, one or more of the alkylene glycol esters and ethers and mixtures of at least one of the foregoing glycols, glycol ethers and glycol esters with a liquid hydrocarbon, and thereafter recovering from the contacting step a gas stream substantially free of moisture and said acidic gas contaminant.

One of the more specific embodiments of the invention is directed to the removal of hydrogen sulfide from a normally gaseous mixture which comprises countercurrently washing said mixture with a liquid absorbent composition consisting of diethylene glycol containing less than 0.5% by weight of water while maintaining said composition substantially in liquid phase, removing from the washing step a fat absorbent composition comprising hydrogen sulfide dissolved in said glycol, separately heating said fat absorbent composition to a temperature sufficient to release dissolved hydrogen sulfide therefrom, introducing xylene into said fat composition at a point at which the temperature of the composition is above the boiling point of xylene at the ambient pressure, thereby by stripping hydrogen sulfide from said composition with xylene vapors and separating hydrogen sulfide from xylene and regenerated glycol absorbent composition.

The gas washing process of this invention may be applied successfully to mixtures of certain acidic gases with other gases essentially insoluble in the present absorbent composition. As referred to herein, an acidic gas is any material which at normal temperatures exists in the gaseous state and which produces an acidic solution when dissolved in water; that is, reduces the pH of the water to a value below 7. The process is particularly applicable to the extraction or removal of sulfur-containing gases from admixture with light hydrocarbon gases, hydrogen, nitrogen, carbon monoxide, or other essentially inert gas insoluble in the present absorbent composition, including especially hydrogen sulfides, sulfur dioxide, carbon dioxide, and hydrogen cyanide. The present gas absorption process is believed to be essentially a process involving the physical dissolution of the acidic gas in the absorbent composition containing the glycolic compound, including particularly, glycol-hydrocarbon mixtures. Although the use of glycol-containing absorbent compositions for removal of acidic gases from gas mixtures has heretofore been practiced in the art, the operation of such prior absorption processes has been predicated upon the presence of at least a certain minimum quantity of water and basic ingredients (usually amines) in the glycol to react chemically with the acidic gas; consequently, the glycolic absorbents heretofore employed in gas absorption processes have been merely high-boiling organic diluents for aqueous amines, and the operability of the composition for extracting the acidic gas from the mixture of gases was predicated on chemical combination rather than on physical absorption by the solvent. It has now been discovered, on the other hand, that glycolic absorbent compositions are completely operable as washing agents for the removal of acidic gases from mixtures with other gases in the absence of substantial amounts of either water or amines in the absorbent. Utilizing the present substantially anhydrous absorbents in combination, it is thus feasible to operate an absorption process in which the acidic gas component of the gaseous feed stock dissolves in the absorbent composition merely by physical dissolution in the glycolic absorbent, particularly when the absorbent composition is a combination of a hydrocarbon component, especially an aromatic hydrocarbon, with the glycolic constituent. The absence of any substantial amount of water in the present absorbent composition contributes significantly to certain advantages in the treatment of gas mixtures for the dual purpose of removing both the water vapor content of the mixture and the acidic gas component therefrom. The use of the present, substantially anyhdrous absorption composition, as distinguished from glycols and glycol-hydrocarbon mixtures containing even relatively small quantities of water as part of the composition, reduces the residual water vapor content of the treated gas to extremely low values, while the presence of even a few percent of water in the glycol or glycol-hydrocarbon absorbent mixture permits the retention of much higher quantities of water vapor in the treated gas effluent under the same conditions of gas treatment. The result of such use of a substantially anhydrous gas absorption composition when one of the major components of the composition is an effective desiccant, as in the present process, is the recovery of a treated gas product which for all practical purposes is substantially bone dry and is adapted for use in a process in which the presence of even small amounts of water vapor are objectionable, as in the case of certain catalytic processes heretofore mentioned. A further additional advantage in the use of a substantially anhydrous glycolic absorbent when the latter is utilized in combination with a hydrocarbon component at least partially soluble therein, is the fact that the hydrocarbon component becomes much more soluble in the glycolic constituent of the composition when the latter is anhydrous, the water tending to reduce the solubility of the hydrocarbon in the glycolic compound.

The principal component of the present gas absorbent composition which is essential for its activity not only as a desiccant to remove the water vapor from the gaseous feed stock mixture, but also to provide the solvent for the acidic gaseous component even in the absence of a hydrocarbon, is referred to herein as a glycolic compound, preferably selected from the alkylene glycols, and certain derivatives thereof which are liquid at the operating temperatures and pressures involved in the present gas scrubbing operation. The glycolic compounds having utility in the present process are of fluid, non-viscous character and have a relatively high boiling point, such that the absorbent composition remains in substantially liquid phase at the ambient or operating temperatures and pressures. The preferred glycolic compounds are those which are completely miscible both with water and with the hydrocarbon component of the absorption composition when utilized, and at the concentrations thereof employed in the composition. In general, suitable glycolic compounds for this purpose include the alkylene glycols, the inter-condensation products of the glycols, commonly referred to as the "polyalkylene glycols," and the alcohol ethers and the organic acid esters of the glycols and polyalkylene glycols. Typical alkylene glycols within the class of compounds referred to as glycolic compounds are ethylene glycol, propylene glycol, butylene glycol, glycerol, trimethylene glycol, and other di- and tri-hydroxy substituted aliphatic compounds containing up to about 5 carbon atoms per molecule. Other glycolic compounds commonly referred to as glycols or polyalkylene glycols include such compounds as diethylene glycol (alpha, omega-dihydroxydiethylene oxide), triethylene glycol (alpha, omega-dihydroxyoxyethylenediethylene oxide), tetraethylene glycol, dipropylene glycol, etc., containing not more than about 4 oxyalkylene units per molecule. Typical alcohol ethers of the glycols useful in the present process are the methyl, ethyl, propyl and butyl ethers of mono, di-, and tri-ethylene glycols. Typical organic acid esters of the glycols useful as the primary solvent component of the present gas absorption composition, are the formic acid, acetic acid and propionic acid esters of both the mono- and polyethylene and mono- and polypropylene glycols, including the di-esters of the alpha and omega hydroxyl groups. Although the selection of the particular glycol, glycol ether or glycol ester or mixtures thereof utilized in the gas absorption composition is ultimately dependent upon the volatility and viscosity characteristics of the glycolic compound at the particular operating temperatures and pressures, diethylene glycol or a mixture of diethylene and propylene glycols is generally preferred for most gas washing operations because of the desirable boiling point and low viscosity characteristics of these glycol compounds which make their use at the usual gas washing temperatures particularly suitable for this purpose. The glycol is supplied to the process in making up the gas absorbent composition in its substantially anhydrous condition, preferably containing less than 0.5% by weight of water, although the water content of the glycol may be as high as about 8% of the final composition.

As provided in the present gas scrubbing process, the absorption composition may contain a hydrocarbon component as initially supplied to the process or the hydrocarbon may be injected into the fat composition during the stripping, that is, the regeneration stage of the process. When combined with the glycolic compound in making up the initial gas absorbent composition, the hydrocarbon component contributes materially in enhancing the absorptive capacity of the absorption composition for the acidic gas component of the feed stock mixtures supplied to the process, and also functions in providing a stripping agent to remove both the absorbed acidic gas and the moisture from the fat composition during the regeneration stage of a cyclic process. In addition to the foregoing advantages, the presence of the hydrocarbon component in the absorbent composition also reduces the viscosity of the composition and thereby promotes extraction or absorption of the acidic gaseous component from the feed stock gas mixture. The preferred hydrocarbons for this purpose are those which are at least partially and preferably, wholly soluble in the glycolic compound. The useful hydrocarbon compounds for this purpose include generally the aliphatic, naphthenic, and preferably the aromatic series of hydrocarbons containing from about 6 to about 18 carbon atoms, per molecule. Typical aliphatic and naphthenic hydrocarbons within the above group include the hexanes, hexenes, cyclohexane, cyclohexene, the heptanes, methyl-cyclohexane, the octanes and octenes, and other hydrocarbons of the paraffinic, olefinic, cycloparaffinic, and cyclo-olefinic series containing up to about 10 carbon atoms per molecule. The preferred hydrocarbon components of the absorption composition are the aromatic hydrocarbons of the benzene and naphthalene series, such as benzene itself, toluene, xylene, ethylbenzene, cumene, and diethylbenzenes; the naphthalene series, such as the methylnaphthalenes, and other short chain alkyl and dialkyl substituted benzenes and naphthalenes, containing not more than about 4 carbon atoms in any alkyl side chain and not more than a total of about 18 carbon atoms per molecule. One of the preferred aromatic hydrocarbons is xylene, which boils at the preferred regeneration temperature and is relatively soluble in glycolic compounds comprising the absorbent component. Hydrocarbon fractions such as coal tar or petroleum naphthas are also suitable for this purpose, and fractions of catalytically reformed hydrocarbons are especially well adapted for use in conjunction with the purification of the recycle gases used in the reforming operation wherein said reformed naphthas were prepared. Small amounts of hydrocarbon vapors entrained in the purified gases from such an operation can have no unexpected effects on the reforming catalyst, since they are derived from the catalytic process itself.

Any suitable proportions of the glycolic compound to the hydrocarbon component of the gas absorption composition may be utilized in the present process, but preferably a predominant proportion of the composition comprises the glycol component and a relatively minor proportion of the hydrocarbon component. Such compositions have the desired extraction, viscosity and boiling point characteristics for optimum operation of the absorption process. The preferred compositions contain from 2 to about 30% by weight of the hydrocarbon component, and more particularly from about 5 to about 15% by weight of the composition. It is to be emphasized, however, that the initial absorbent composition supplied to the absorption tower need not necessarily contain the hydrocarbon component selected from the class hereinbefore noted, although in a continuous, cyclic process in which the regenerated lean absorbent composition is recycled to the absorption stage, the regenerated composition generally contains a significant amount of the hydrocarbon retained therein by virtue of incomplete vaporization during the regeneration stage. In selecting the preferred hydrocarbon for any particular operation, the hydrocarbon selected is preferably one which may be readily vaporized or distilled from the absorption composition when the latter is subsequently heated during the regeneration stage to distill the absorbed acidic gas therefrom.

The gas absorption process of the present invention and several of its specific embodiments relating to various methods of effecting the operation are further described in the accompanying diagram which illustrates a gas absorption flow diagram and depicts a combination of the absorption and stripping or regeneration stages involved in the process. Reference will hereafter be made to the accompanying diagram in general terms, since the present method is adaptable to a wide variety of charging stocks containing various types of acidic gases and to several methods of operation described in general terms.

Referring to the accompanying diagram, a contaminated feed stock gas mixture, such as a mixture comprising predominantly hydrogen containing hydrogen sulfide and water vapor as contaminants is introduced into countercurrent absorption column 1 through line 2 containing valve 3 at a flow rate of sufficient velocity to provide the desired rate of treatment but insufficient to cause entrainment of the liquid absorbent in the effluent gas stream removed from the column, as hereinafter described. Absorption column 1 is generally a vertical tower which may be packed with solid particles of a suitable contacting material such as Berle saddles, coke, granite chips, etc. or may be a gas-liquid contact tower containing bubble caps and trays of conventional design and fabrication arranged to obtain countercurrent finely-divided contact between the liquid absorbent composition and the gaseous stream. The feed stock gas mixture may be introduced into absorber 1 under pressure in order to enhance the rate of absorption of the acidic gaseous component in the liquid absorbent and at temperatures preferably within the range of from about 0° to about 120° C. For this purpose a compressor and/or heater may be installed in line 2, although not illustrated on the accompanying diagram. Suitable operating pressures are within the range of from atmospheric to about atmospheres, although higher pressures may be utilized depending upon the charging stock and liquid absorbent utilized.

The liquid absorbent is charged into the upper portion of absorption column 1 through line 4 and may be derived from regenerated or lean absorbent composition, formed as hereinafter indicated, or may be made up of a combination of regenerated and fresh absorbent. The liquid absorbent flows downwardly through column 1 in countercurrent contact with the feed stock gas mixture flowing upwardly through the column, the acidic gaseous contaminant being removed from the feed stock mixture during the countercurrent contact. A treated gas effluent, substantially free of acidic gas contaminant and any moisture which may have been present in the feed stock is removed from the upper portion of the absorption column through line 5 in amounts determined by valve 6. When the liquid absorbent composition is made up to contain a liquid hydrocarbon component present in the composition supplied to the absorption tower the latter hydrocarbon component may be introduced either in admixture with the glycolic compound or may be separately introduced as an individual stream, for example through line 7 in amounts controlled by valve 8. The hydrocarbon stream may be derived from the stripper overhead, recycled in the process as hereinafter described or from fresh hydrocarbon charge stock.

A stream of fat absorbent composition containing dissolved in the glycolic compound or glycol-hydrocarbon mixture the acidic gas contaminant of the feed stock is removed from the bottom of absorption column 1 through line 9 at a rate determined by valve 10 and is thereafter transferred by means of pump 11 into line 12, through heater 13, into stripper or regeneration column 14 via line 12a and valve 12b, being generally introduced into the upper or into an intermediate portion of column 14 for separation and removal of the acidic gas and water vapor contaminants therefrom. Pump 11 generally operates as merely a transfer pump, although it may also serve to increase the pressure on the fat absorbent stream prior to introduction into stripping column 14; if stripping column 14 is operated at a lower pressure than the absorber 1, however, pump 11 may be eliminated. Heater 13 supplies sufficient heat to the fat absorbent stream to effect substantially complete vaporization or flashing of the acidic gas and any water present in the fat absorbent stream when the latter is discharged into stripping column 14 which is generally operated at a somewhat lower pressure than the ambient pressure on the fat absorbent stream, thereby effecting such flashing. Thus, the fat absorbent stream may be heated up to about 300° C., preferably to a temperature within the range of from about 100° to about 250° C. and stripping column 14 may be operated at atmospheric or slightly superatmospheric pressure in order to obtain the aforesaid stripping and flashing action therein.

A normally liquid hydrocarbon which boils at a temperature below the temperature at which column 14 is operated and which may be the same or different from the hydrocarbon component of the absorbent composition is introduced into column 14 under pressure through line 15 from storage in amounts controlled by valve 16, the hydrocarbon being transferred to column 14 by means of pump 17 and line 18, through heater 19 which raises the temperature of the hydrocarbon above its boiling point prior to introduction into column 14 through line 20 and valve 20a. Alternatively, the contents of stripper 14 may be maintained at a temperature above the boiling point of the hydrocarbon, and the latter introduced into column 14 in liquid form. The inlet port for the hydrocarbon stream is generally in the lower portion of the column in order that the resulting vapors formed either in heater 19 or within column 14 may act as a stripping medium in the upper portion of column 19 to remove water and the acidic gaseous contaminants present in the fat absorbent composition by virtue of the stripping action of the hydrocarbon vapors.

In order to introduce additional heat into the fat absorption composition to thereby accomplish a greater degree of stripping in column 14, the column may be fitted with a reboiling coil, such as reboiler 21, supplied with a hot fluid heating medium heated by furnace 22. The stripping action may be further enhanced by introducing a countercurrent stream of a normally gaseous material charged into column 14 through line 23 at a rate of flow controlled by valve 24, line 23 having an outlet port generally in the lower portion of the column to obtain maximum countercurrent effect. The stripping gas may be any inert, non-absorbable material which is a gas at the operating temperature and pressure in column 14, such as nitrogen, hydrogen, a light hydrocarbon gas, such as butane, methane, ethane, propane, and other gases.

The fat absorbent composition which is charged into column 14 in the upper or intermediate portion of the column flows downwardly in countercurrent relationship with the vaporized hydrocarbon and stripping gas if the latter is utilized in the process, the acidic gas and any moisture present in the fat composition being stripped therefrom as it flows in countercurrent relationship with the hot hydrocarbon vapors rising through the column. Reboiling coil 21 is designed to supply sufficient heat to remove the last traces of moisture and acidic gas contaminants just prior to removal of the lean, regenerated absorbent composition from the column through line 25, which is connected to an outlet port in the lower portion of column 14. The thus regenerated absorbent composition flows through line 25 and valve 26 by means of pump 27 which discharges the regenerated absorbent composition into recycle line 28. In recycling the lean or regenerated absorbent composition it is desirably cooled prior to use in absorber 1 and this may be effected by passing the hot composition through cooler 29 which lowers the temperature of the liquid absorbent to the desired operating temperature in absorption column 14, as stated aforesaid. The cooled composition is thereafter discharged into line 4 leading into the upper portion of the absorber 1. Any glycolic compound required to replace portions thereof lost from the absorbent composition may be introduced into the recycle absorbent stream from storage through line 30 and valve 31, in amounts required for efficient operation of the process. Any liquid hydrocarbon required to make up the absorbent composition for use in column 1 where an absorbent composition containing both the glycolic and hydrocarbon components is utilized, may be transferred from storage through lines 15, valve 16, pump 17 and line 18, the hydrocarbon being diverted from line 18 into line 7 connecting therewith and leading into column 1.

A light vapor overhead containing released acidic gas contaminant, hydrocarbon and water vapors, such as an azeotropic mixture of the hydrocarbon and water, together with stripping gas, if utilized in the process, is removed from column 14 through vapor overhead line 32 connecting with overhead condenser 33 which liquefies the hydrocarbon and water vapor components of the overhead stream. The resulting mixed gases and liquids are removed from condenser 33 through line 34 and valve 35 and are thereafter discharged into receiver vessel 36 wherein the liquid and gaseous components of the overhead may be separated. The acidic gaseous contaminant released from the fat absorbent composition during the regeneration stage, together with any stripping gas, if utilized in the stripping column, is separated from the condensed liquids in receiver vessel 36 and removed from the process flow through line 37 and valve 38 for discharge from the process flow or recovery, if desired. Any water vapor stripped from the fat absorbent composition and condensed to liquid water in cooler 33 settles to the bottom of receiver vessel 36 and may be removed therefrom through line 39 and valve 40 for discharge from the process flow. The condensed liquid hydrocarbon which forms an upper liquid layer in receiver vessel 36 is decanted from the water layer through line 41 in amounts controlled by valve 42 for recycling in the process flow. In the preferred method of operating the stripping column, at least a portion of the condensed liquid hydrocarbon is recycled into the upper portion of stripping column 14 to provide a liquid reflux therein and for this purpose the condensed hydrocarbon removed from receiver vessel 36 through line 41 may be transferred through line 43 (connecting with line 41) by means of pump 44 which discharges the reflux liquid hydrocarbon into line 45 leading into the upper portion of column 14. The amount of hydrocarbon thus refluxed is controlled by valve 46. A portion of the liquid hydrocarbon which is not refluxed into column 14 may be transferred via line 47 through valve 48 into line 28 to make up the lean absorbent composition recycled to absorption column 1 when a composition containing both the hydrocarbon and glycolic compound is utilized as liquid absorbent in column 1. Instead of recycling all of the non-refluxed liquid hydrocarbon, as for example, when a purely glycolic compound absorbent composition is utilized in the absorption stage, any portion of said non-refluxed liquid hydrocarbon may be recycled to the lower portion of the stripping column to provide the vaporized hydrocarbon stripping agent therein, and this may be effected by diverting the stream of hydrocarbon in line 47 into line 49 and through valve 50, said line 49 connecting with line 47 and line 18, which provides the transfer means for conveying the liquid hydrocarbon into the stripping column, as hereinbefore described.

We claim as our invention:

1. A gas washing process which comprises contacting a gas mixture contaminated by an acidic gaseous component with a substantially anhydrous liquid absorbent composition comprising at least one glycolic compound and a liquid hydrocarbon, and thereafter recovering from the contacting step a gas stream substantially free of said acidic gaseous contaminant.

2. The process of claim 1 further characterized in that said glycolic compound is a water-soluble, desiccating alkylene glycol.

3. The process of claim 2 further characterized in that said alkylene glycol is ethylene glycol.

4. The process of claim 2 further characterized in that said alkylene glycol is propylene glycol.

5. The process of claim 1 further characterized in that said glycolic compound is diethylene glycol.

6. The process of claim 1 further characterized in that said absorbent composition comprises a mixture of diethylene and propylene glycols.

7. The process of claim 1 further characterized in that said liquid hydrocarbon is an aromatic hydrocarbon containing up to about 18 carbon atoms.

8. The process of claim 7 further characterized in that said aromatic hydrocarbon is benzene.

9. The process of claim 7 further characterized in that said aromatic hydrocarbon is toluene.

10. The process of claim 7 further characterized in that said aromatic hydrocarbon is xylene.

11. A gas washing process which comprises contacting a gas mixture containing an acidic gaseous component with a substantially anhydrous liquid adsorbent mixture of a liquid hydrocarbon with at least one constituent selected from the water-soluble, desiccant alkylene glycols, and polyalkylene glycols, the organic acid esters and alcohol ethers of said alkylene and polyalkylene glycols recovering from the contacting stage a gas stream substantially free of said acidic contaminant and subjecting the resulting fat absorbent composition to regeneration by stripping therefrom the absorbed acidic gaseous contaminant.

12. The process of claim 11 further characterized in that the stripping step is effected by contacting said fat absorbent composition with a normally liquid hydrocarbon at a temperature sufficient to effect vaporization of said hydrocarbon.

13. The process of claim 12 further characterized in that said last mentioned normally liquid hydrocarbon is the same as the liquid hydrocarbon component of said absorbent mixture.

14. A process for separating hydrogen sulfide from a gas containing the same which comprises, contacting the gas with a substantially anhydrous liquid absorbent consisting essentially of at least one alkylene glycol and a liquid hydrocarbon, and withdrawing from the contacting step a gas stream substantially free of hydrogen sulfide.

15. The process of claim 11 further characterized in that an inert gas is introduced into the fat absorbent composition and countercurrently contacted with said composition during said regeneration.

16. A process for separating an acidic gaseous component from a hydrocarbon gas containing the same which comprises contacting said gas with a substantially anhydrous mixture of a minor proportion of a liquid hydrocarbon and a major proportion of a glycol component consisting essentially of at least one compound selected from the group consisting of the alkylene glycols and polyalkylene glycols and the alcohol ethers and organic acid esters of said glycols.

17. The process of claim 16 further characterized in that said liquid hydrocarbon constitutes from about 2 to about 30% by weight of said substantially anhydrous mixture, the remainder of the latter being at least one alkylene glycol.

18. The process of claim 17 further characterized in that said liquid hydrocarbon is an aromatic hydrocarbon containing not more than about 18 carbon atoms per molecule and said alkylene glycol is diethylene glycol.

References Cited in the file of this patent
UNITED STATES PATENTS

| Number | Name | Date |
|---|---|---|
| 2,086,731 | Millar et al. | July 13, 1937 |
| 2,177,068 | Hutchinson | Oct. 24, 1939 |
| 2,379,076 | Gollmar | June 26, 1945 |
| 2,614,904 | Royer | Oct. 21, 1952 |
| 2,620,895 | Turner | Dec. 9, 1952 |
| 2,670,810 | Dorsey | Mar. 2, 1954 |